US 6,617,055 B2

(12) United States Patent
Gill

(10) Patent No.: US 6,617,055 B2
(45) Date of Patent: Sep. 9, 2003

(54) SPIN VALVE SENSOR WITH LOW MOMENT FREE LAYER

(75) Inventor: Hardayal Singh Gill, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/835,962

(22) Filed: Apr. 10, 2001

(65) Prior Publication Data

US 2002/0146591 A1 Oct. 10, 2002

(51) Int. Cl.$^7$ ................................................. G11B 5/66
(52) U.S. Cl. ...................... 428/692; 428/611; 428/622; 428/627; 428/628; 428/632; 428/641; 428/660; 428/667; 428/620; 428/900; 428/928; 427/128; 427/129; 427/130; 427/131; 360/113; 324/252
(58) Field of Search ................................ 428/611, 622, 428/627, 629, 632, 641, 660, 667, 620, 628, 682, 800, 928; 360/113; 324/252; 427/128–131

(56) References Cited

U.S. PATENT DOCUMENTS

| 3,761,904 A | | 9/1973 | Chin et al. .................. 365/133 |
| 4,657,819 A | | 4/1987 | Funaki ........................ 428/458 |
| 4,905,074 A | | 2/1990 | Chao et al. .................. 257/677 |
| 4,935,201 A | | 6/1990 | Inoue et al. ................. 420/458 |
| 5,658,658 A | | 8/1997 | Yamamoto .................. 428/332 |
| 5,725,963 A | * | 3/1998 | Iwasaki ...................... 428/611 |
| 5,788,783 A | | 8/1998 | Coutu et al. ................ 148/312 |
| 5,896,252 A | * | 4/1999 | Kanai ......................... 360/113 |

FOREIGN PATENT DOCUMENTS

JP          60-087412      5/1985

* cited by examiner

*Primary Examiner*—Leszek Kiliman
(74) *Attorney, Agent, or Firm*—Ervin F. Johnston

(57) ABSTRACT

At least a portion of a free layer structure in a spin valve sensor is composed of nickel iron molybdenum (NiFeMo) so that the free layer structure does not have to be reduced in thickness in order to have a reduced magnetic moment for responding to lower signal fields from smaller bits on a rotating magnetic disk.

27 Claims, 5 Drawing Sheets

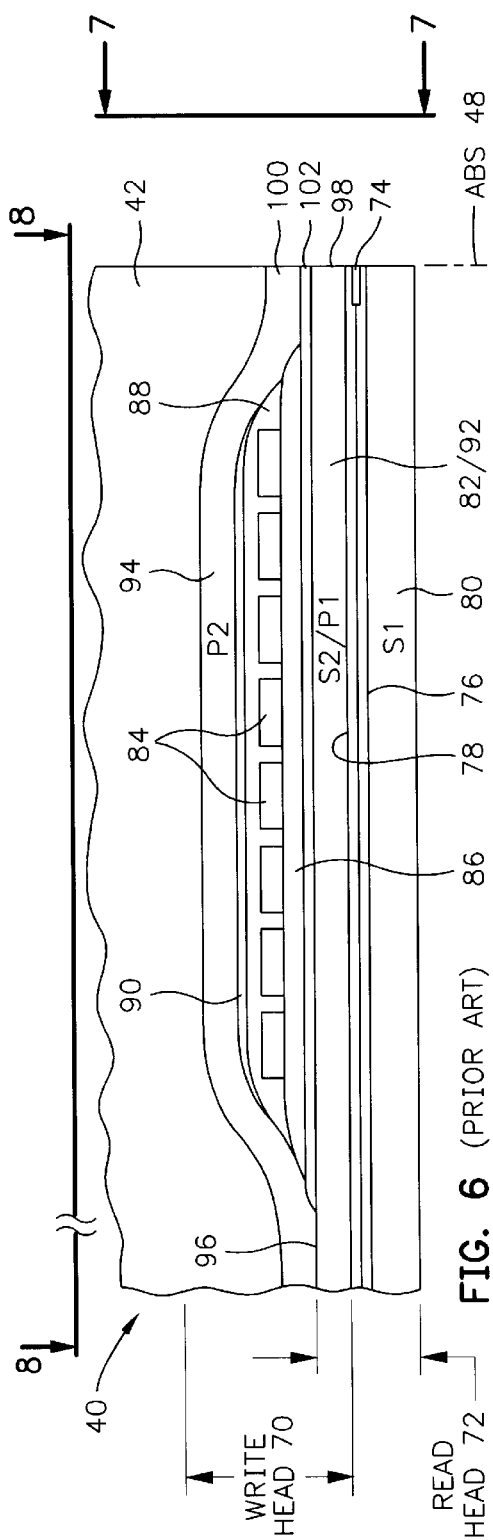
FIG. 6 (PRIOR ART)
FIG. 7 (PRIOR ART)
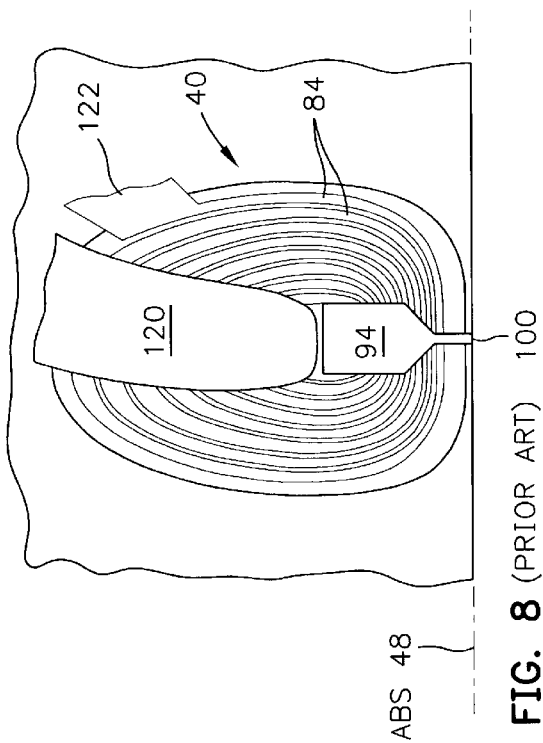
FIG. 8 (PRIOR ART)

(ABS)

SPIN VALVE SENSOR WITH LOW MOMENT FREE LAYER

BACKGROUND OF THE INVENTION

1. Field of the Invention

The present invention relates to a spin valve sensor with a low moment free layer and, more particularly, to a free layer which is composed of nickel iron molybdenum (NiFeMo) for high linear density reading by a read head.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive first spacer layer sandwiched between a ferromagnetic pinned layer structure and a ferromagnetic free layer structure. An antiferromagnetic pinning layer interfaces the pinned layer structure for pinning a magnetic moment of the pinned layer structure 90° to an air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or bias point position in response to positive and negative magnetic field signals from a rotating magnetic disk. The quiescent position, which is parallel to the ABS, is the position of the magnetic moment of the free layer structure with the sense current conducted through the sensor in the absence of signal fields.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of cos θ, where θ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

In addition to the spin valve sensor the read head includes nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a top or a bottom spin valve sensor depending upon whether the pinning layer is located near the bottom of the sensor close to the first read gap layer or near the top of the sensor close to the second read gap layer. Spin valve sensors are further classified as simple pinned or antiparallel pinned depending upon whether the pinned layer structure is one or more ferromagnetic layers with a unidirectional magnetic moment or a pair of ferromagnetic layers that are separated by a coupling layer with magnetic moments of the ferromagnetic layers being antiparallel. Spin valve sensors are still further classified as single or dual wherein a single spin valve sensor employs only one pinned layer and a dual spin valve sensor employs two pinned layers with the free layer structure located therebetween.

The free layer structure typically employs a nickel iron layer which provides a desirable magnetic softness for the free layer. This means that the free layer has a low uniaxial anisotropy $H_K$ which promotes responsiveness of the free layer structure to signal fields from a rotating magnetic disk. When the free layer structure is highly responsive a small signal field will rotate the magnetic moment of the free layer structure which causes a change in the magnetoresistance of the spin valve sensor. It has been found that when the free layer structure also includes a cobalt iron or cobalt layer, sometimes referred to as a nanolayer, between the nickel iron layer and the spacer layer and interfacing the spacer layer that the magnetoresistance or magnetoresistive coefficient dr/R is improved. In order to obtain a desirable increase in the magnetoresistive coefficient dr/R, it has been further found that the thickness of the cobalt iron or cobalt layer should be on the order of 15 Å. Unfortunately, any increase in the thickness of the cobalt iron layer reduces the softness of the free layer structure so that it is not as responsive to signal fields from the rotating magnetic disk.

The areal density of a read head is the product of linear bit density and track width density. Linear bit density is quantified as bits per inch (BPI) along the track of the disk and track width density is quantified as tracks per inch (TPI) along the radius of the disk. An increase in the areal density equates to increased storage capacity of a computer which has progressed from kilobytes to megabytes to gigabytes.

The linear bit density is increased by increasing the number of bits per inch along the tracks of the rotating magnetic disk. When this occurs, each bit from the disk produces a lower magnetic field which must be sensed by the spin valve sensor. In order to meet this objective the free layer of the spin valve sensor must be more sensitive to the reduced fields from the smaller bits along the track of the rotating magnetic disk. This means that the magnetic moment of the free layer must be reduced so that it is less stiff in its response to the field from the bits of the rotating disk. This is accomplished by reducing the thickness of the nickel iron layer in the free layer structure so that the magnetic moment of the free layer structure is less and therefore more responsive to lower field signals from the bits of the rotating magnetic disk. The thickness of the cobalt iron layer is preferably not reduced so that the aforementioned improved magnetoresistive coefficient dr/R is maintained. Unfortunately, several angstroms at the top and bottom surfaces of the free layer, as these surfaces interface the spacer and cap layers, intermix with these layers which makes the top and bottom portions of the free layer structure magnetically stiff. As the thickness of the free layer structure is reduced the ratio of these magnetically stiff portions to the central more magnetically soft portion of the free layer increases. Because of these magnetically stiff portions at the interfaces of the free layer structure, the magnetic softness of the free layer structure does not decrease in a desired manner as its thickness is reduced.

SUMMARY OF THE INVENTION

The present invention provides a free layer structure which does not have to be reduced in its thickness in order to be sensitive to high linear bit density recording. This is accomplished by making at least a portion of the free layer structure of nickel iron molybdenum (NiFeMo). In the preferred embodiment the composition is nickel iron molybdenum ($Ni_{78}Fe_{12}Mo_{10}$). The moment of nickel iron molybdenum ($Ni_{78}Fe_{12}Mo_{10}$) is two and one-half times less than nickel iron ($Ni_{83}Fe_{17}$). Accordingly, a nickel iron molybdenum ($Ni_{78}Fe_{12}Mo_{10}$) free layer portion can be two and one-half times as thick as a nickel iron ($Ni_{83}Fe_{17}$) free layer portion with the same magnetic moment. This means that the ratio of the insensitive interface portions of the free layer structure is less and therefore does not impact the magnetic softness of the free layer structure nearly as much as simply reducing the thickness of a nickel iron ($Ni_{83}Fe_{17}$) free layer portion.

An object of the present invention is to provide at least a portion of a free layer of a spin valve sensor with a lower moment than nickel iron without reducing the thickness of the free layer structure.

Another object is to provide a method of making the aforementioned free layer structure.

Other objects and attendant advantages of the invention will be appreciated upon reading the following description taken together with the accompanying drawings.

BRIEF DESCRIPTION OF THE DRAWINGS

FIG. 6 is a partial view of the slider and a merged magnetic head as seen in plane 6—6 of FIG. 2;

FIG. 7 is a partial ABS view of the slider taken along plane 7—7 of FIG. 6 to show the read and write elements of the merged magnetic head;

FIG. 8 is a view taken along plane 8—8 of FIG. 6 with all material above the coil layer and leads removed;

DESCRIPTION OF THE PREFERRED EMBODIMENTS

Magnetic Disk Drive

Figure 1:
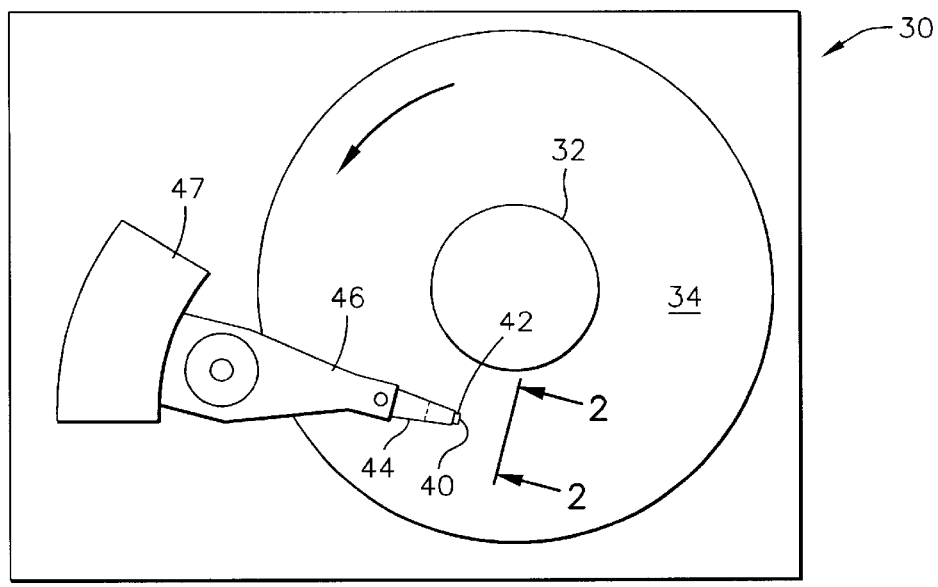
FIG. 1 is a plan view of a magnetic disk drive.
Figure 2:
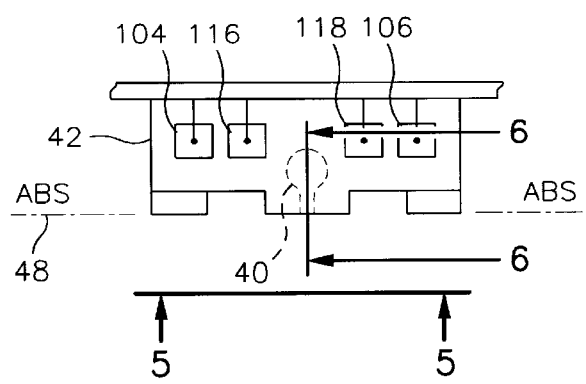
FIG. 2 is an end view of a slider with a magnetic head of the disk drive as seen in plane 2—2 of FIG. 1.
Figure 3:
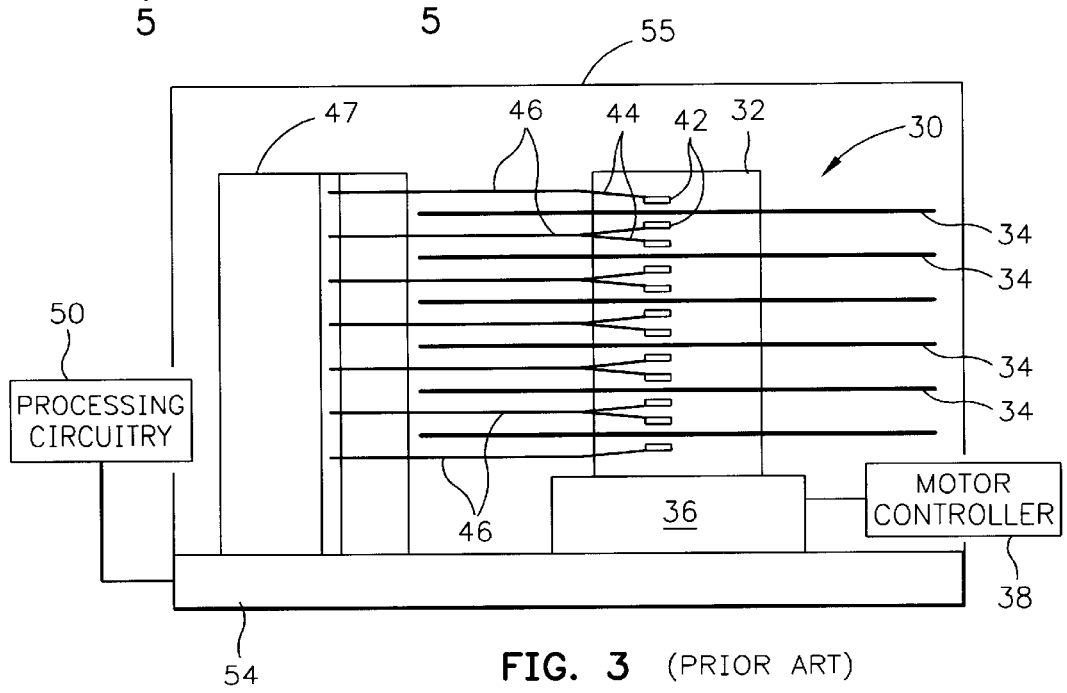
FIG. 3 is an elevation view of the magnetic disk drive wherein multiple disks and magnetic heads are employed.
Figure 4:
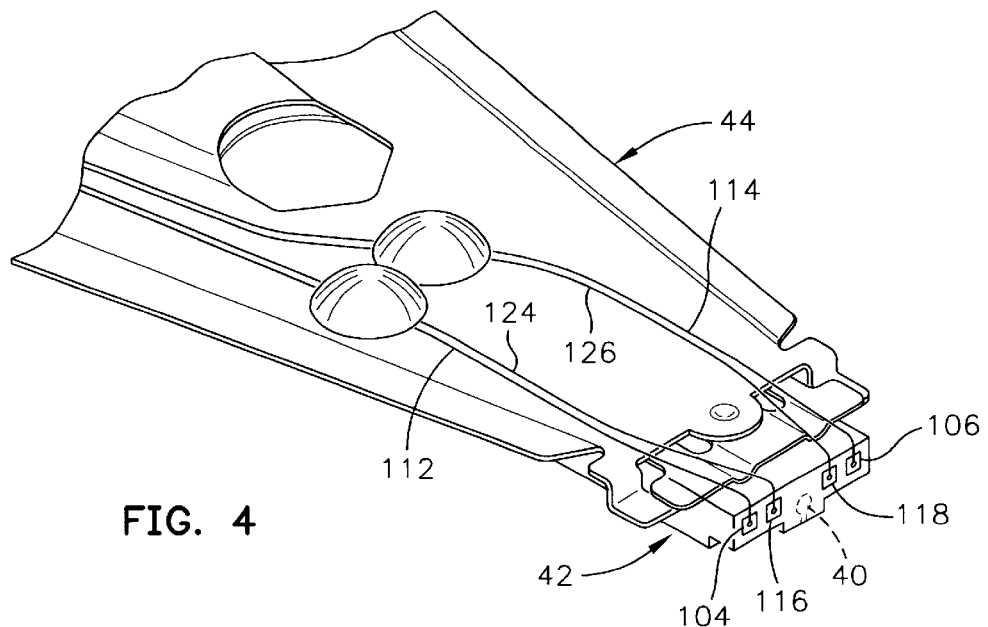
FIG. 4 is an isometric illustration of a suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
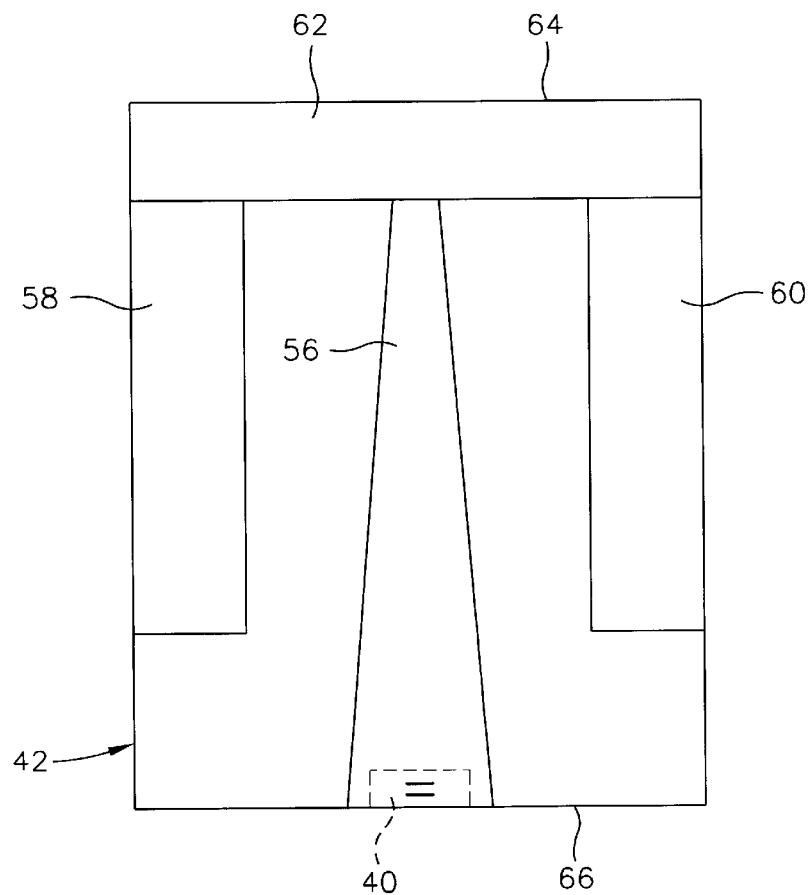
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a merged magnetic head 40, which includes a write head portion 70 and a read head portion 72, the read head portion employing a dual spin valve sensor 74 of the present invention. FIG. 7 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current Is conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head the second shield layer and the first pole piece layer are separate layers which are separated by a nonmagnetic layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
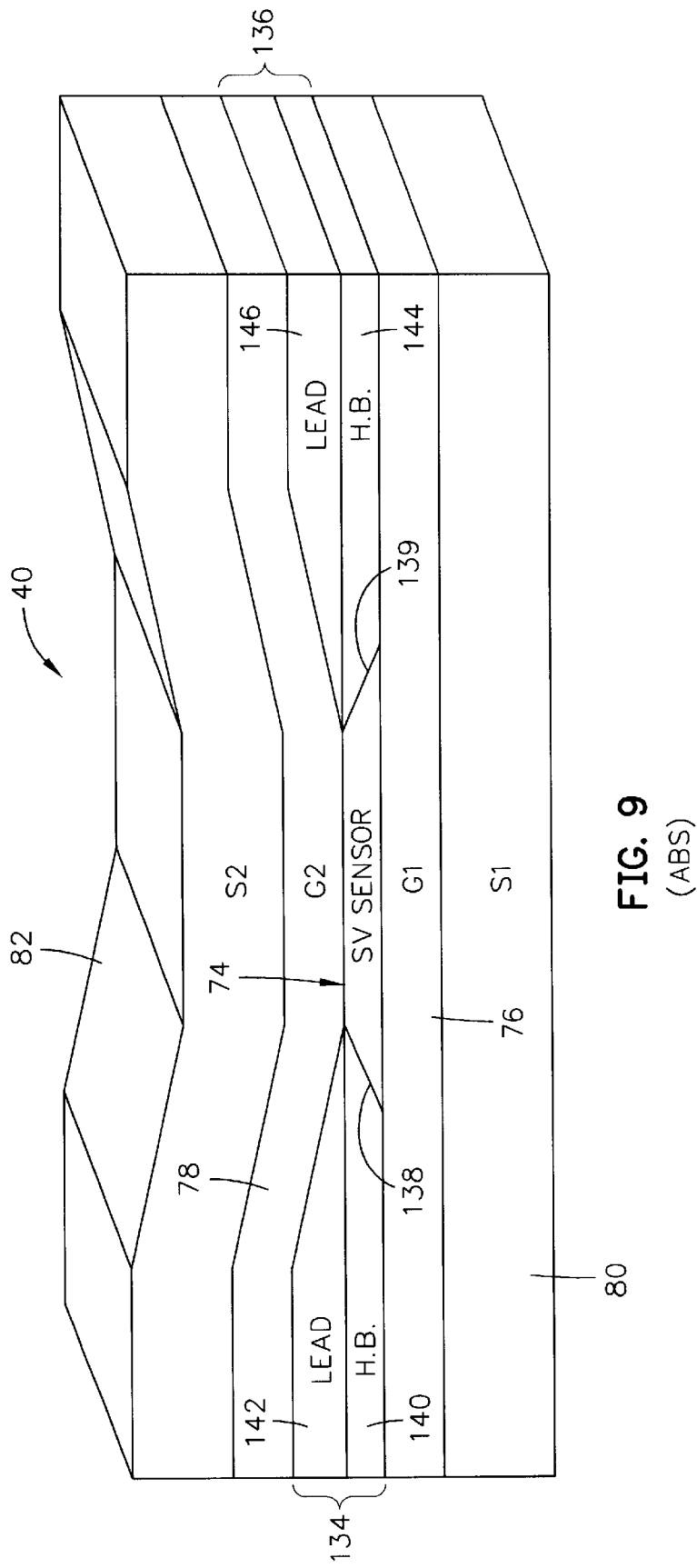
FIG. 9 is an enlarged isometric illustration of the read head with a spin valve sensor.

FIG. 9 is an enlarged isometric ABS illustration of the read head 40 shown in FIG. 6. The read head 40 includes the spin valve sensor 74. First and second hard bias and lead layers 134 and 136 are connected to first and second side edges 138 and 139 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 74 for stabilizing the magnetic domains therein. The spin valve sensor 74 and the first and second hard bias and lead layers 134 and 136 are located between the nonmagnetic electrically insulative first and second read gap layers 76 and 78. The first and second read gap layers 76 and 78 are, in turn, located between the ferromagnetic first and second shield layers 80 and 82.

The Invention

Figure 10:
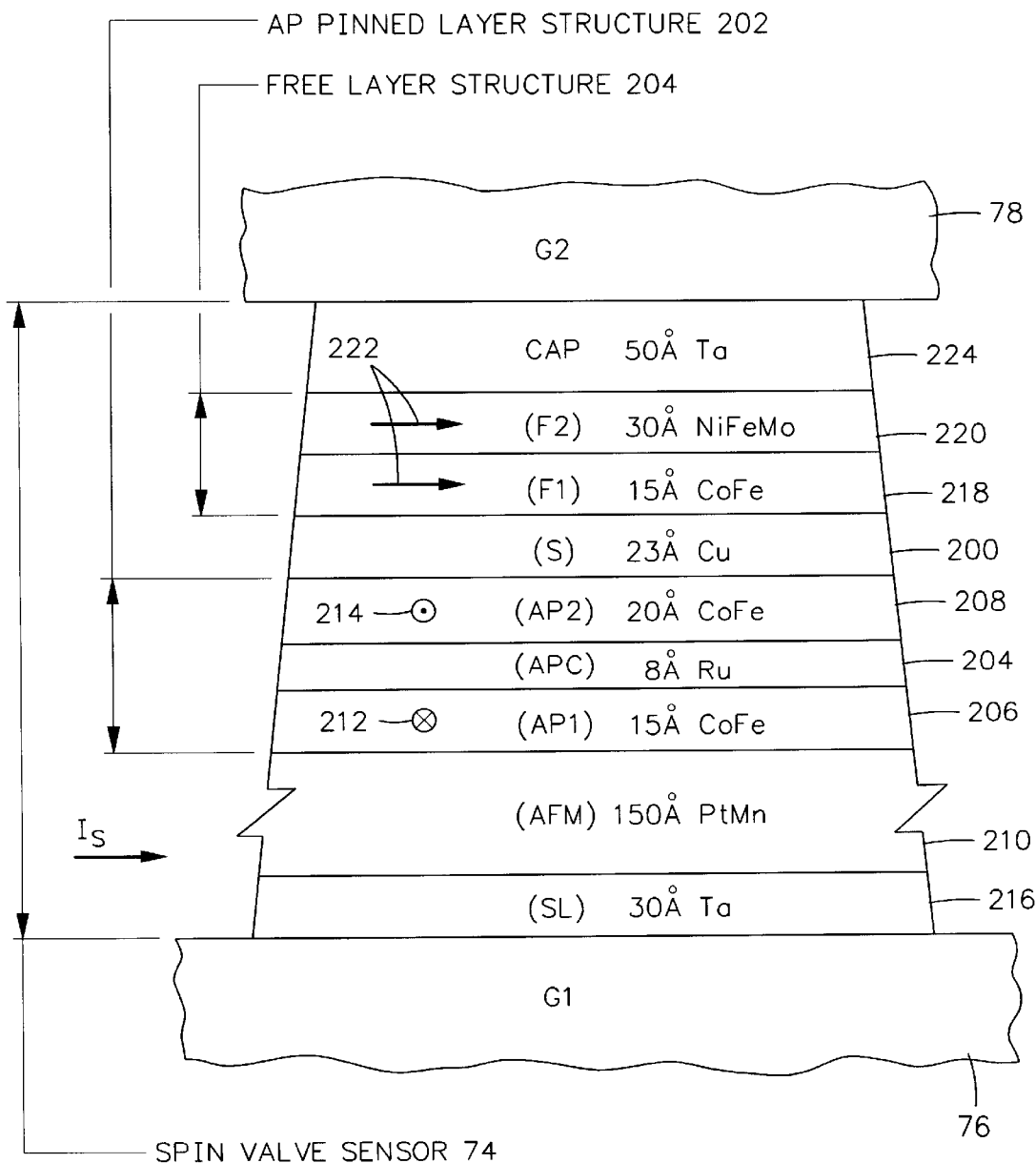
FIG. 10 is an ABS illustration of a preferred embodiment of the present spin valve sensor.

FIG. 10 is an ABS illustration of the present spin valve sensor which is located between the first and second read gap layers 76 and 78. The sensor includes a spacer layer 200 which is located between a pinned layer structure 202 and a free layer structure 204. The pinned layer structure is preferably an antiparallel (AP) pinned layer structure which has an antiparallel coupling (APC) layer 204 which is located between first and second antiparallel (AP) pinned layers (AP1) and (AP2) 206 and 208. The first AP pinned layer 206 interfaces and is exchange coupled to an antiferromagnetic (AFM) pinning layer 210 which pins a magnetic moment 212 of the first AP pinned layer perpendicular to the ABS out of the sensor or into the sensor as shown in FIG. 10. By strong antiparallel coupling between the first and second AP pinned layers 206 and 208 a magnetic moment 214 of the second AP pinned layer is pinned antiparallel to the magnetic moment 212. A seed layer (SL) 216 may be provided below the pinning layer 210 for promoting a desirable texture of the layers deposited thereon.

The free layer structure 204 may include first and second free layers (F1) and (F2) 218 and 220. The free layer structure 204 has a magnetic moment 222 which is oriented parallel to the ABS and to the major planes of the layers in a direction from right to left or from left to right, as shown in FIG. 10. A cap layer 224 may be provided on the free layer structure 204 for protecting it from subsequent processing steps. When a field signal from a rotating magnetic disk rotates the magnetic moment 222 into the sensor the magnetic moment 222 becomes more antiparallel to the magnetic moment 214 which increases the resistance of the sensor to a sense current $I_s$ and when a magnetic moment rotates the magnetic moment 222 of the free layer out of the sensor the magnetic moments 222 and 214 become more parallel which reduces the resistance of the sensor to the sense current $I_s$. These resistance changes are processed as playback signals by the processing circuitry 50 shown in FIG. 3.

As stated hereinabove, the first free layer 218 is preferably 15 Å of cobalt iron (CoFe) for increasing the magnetoresistive coefficient dr/R of the sensor. Accordingly, this layer should not be reduced in its thickness or eliminated, even though its magnetic moment is about 1.5 times as great as nickel iron (NiFe). In the past the second free layer 220, which is nickel iron (NiFe), is reduced in its thickness in order to reduce the overall moment of the free layer structure 204 to make it more sensitive to smaller bits along the track of the rotating magnetic disk. As stated hereinabove, this increases the ratio of the ineffective portions of the free layer structure which interface the spacer and cap layers 200 and 224 which ratio renders the free layer structure with an undesirable magnetic moment for high linear bit density recording. This problem has been overcome by providing a second free layer 220 which is composed of nickel iron molybdenum (NiFeMo). In a preferred embodiment, the second free layer 220 is composed of nickel iron molybdenum ($Ni_{78}Fe_{12}Mo_{10}$). This composition has a moment which is two and one-half times less than nickel iron ($Ni_{83}Fe_{17}$). Accordingly, with the present invention the free layer structure does not have to be reduced in its thickness in order to make it sufficiently soft to respond to reduced signal fields from smaller bits along the tracks of the rotating magnetic disk.

Exemplary thicknesses and materials for the layers are 30 Å of tantalum for the seed layer 216, 150 Å of platinum manganese for the pinning layer 210, 15 Å of cobalt iron for the first AP pinned layer 206, 8 Å of ruthenium for the antiparallel coupling layer 204, 20 Å of cobalt iron for the second AP pinned layer 208, 23 Å of copper for the spacer layer 200, 15 Å of cobalt iron for the first free layer 218, 30 Å of nickel iron molybdenum for the second free layer 220 and 50 Å of tantalum for the cap layer 224.

Discussion

The preferred composition of the materials are $Pt_{50}Mn_{50}$ for the platinum manganese pinning layer, $Ni_{83}Fe_{17}$ for the nickel iron layers and $Co_{90}Fe_{10}$ for the cobalt iron layers. It should be understood that cobalt may be substituted for the cobalt iron layers and that other materials may be used for the pinning layers such as nickel manganese or iridium manganese.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head which has an air bearing surface (ABS), comprising:

a spin valve sensor including:

a ferromagnetic pinned layer structure that has a magnetic moment;

a pinning layer exchange coupled to the pinned layer structure for pinning the magnetic moment of the pinned layer structure;

a ferromagnetic free layer;

a nonmagnetic electrically conductive spacer layer located between the free layer and the pinned layer structure; and the free layer being composed of nickel iron molybdenum (NiFeMo).

2. A magnetic read head as claimed in claim 1 including:

nonmagnetic electrically nonconductive first and second read gap layers;

the spin valve sensor being located between the first and second read gap layers;

ferromagnetic first and second shield layers; and the first and second read gap layers being located between the first and second shield layers.

3. A magnetic read head as claimed in claim 2 wherein the free layer is composed of nickel iron molybdenum ($Ni_{78}Fe_{12}Mo_{10}$).

4. A magnetic read head as claimed in claim 3 wherein the pinned layer structure is an antiparallel (AP) pinned layer structure that includes:

ferromagnetic first and second antiparallel (AP) pinned layers with the first AP pinned layer interfacing the pinning layer and the second AP pinned layer interfacing the spacer layer; and an antiparallel (AP) coupling layer located between and interfacing the first and second AP pinned layers.

5. A magnetic head assembly having an air bearing surface (ABS), comprising:

a write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions; and a read head including:

a spin valve sensor;

nonmagnetic electrically nonconductive first and second read gap layers;

the spin valve sensor being located between the first and second read gap layers;

a ferromagnetic first shield layer; and the first and second gap layers being located between the first shield layer and the first pole piece layer; and the spin valve sensor including:

a ferromagnetic pinned layer structure that has a magnetic moment;

a pinning layer exchange coupled to the pinned layer structure for pinning the magnetic moment of the pinned layer structure;

a ferromagnetic free layer;

a nonmagnetic conductive spacer layer located between the free layer and the pinned layer structure; and the free layer being composed of nickel iron molybdenum (NiFeMo).

6. A magnetic head assembly as claimed in claim 5 wherein the free layer is composed of nickel iron molybdenum ($Ni_{78}Fe_{12}Mo_{10}$).

7. A magnetic head assembly as claimed in claim 6 wherein the pinned layer structure is an antiparallel (AP) pinned layer structure that includes:

ferromagnetic first and second antiparallel (AP) pinned layers with the first AP pinned layer interfacing the pinning layer and the second AP pinned layer interfacing the spacer layer; and an antiparallel (AP) coupling layer located between and interfacing the first and second AP pinned layers.

8. A magnetic disk drive including at least one magnetic head assembly that has an air bearing surface (ABS) and that includes a write head and a read head, comprising:

a write head including:

ferromagnetic first and second pole piece layers that have a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions; and a read head including:

a spin valve sensor;

nonmagnetic electrically nonconductive first and second read gap layers;

the spin valve sensor being located between the first and second read gap layers;

a ferromagnetic first shield layer; and the first and second read gap layers being located between the first shield layer and the first pole piece layer; and the spin valve sensor including:

a ferromagnetic pinned layer structure that has a magnetic moment;

a pinning layer exchange coupled to the pinned layer structure for pinning the magnetic moment of the pinned layer structure;

a ferromagnetic free layer;

a nonmagnetic electrically conductive spacer layer located between the free layer and the pinned layer structure; and the free layer being composed of nickel iron molybdenum (NiFeMo);

a housing;

a magnetic disk rotatably supported in the housing;

a support mounted in the housing for supporting the magnetic head assembly with said ABS facing the magnetic disk so that the magnetic head assembly is in a transducing relationship with the magnetic disk;

a spindle motor for rotating the magnetic disk;

an actuator positioning means connected to the support for moving the magnetic head assembly to multiple positions with respect to said magnetic disk; and a processor connected to the magnetic head assembly, to the spindle motor and to the actuator for exchanging signals with the magnetic head assembly, for controlling movement of the magnetic disk and for controlling the position of the magnetic head assembly.

9. A magnetic disk drive as claimed in claim 8 wherein the free layer is composed of nickel iron molybdenum ($Ni_{78}Fe_{12}Mo_{10}$).

10. A magnetic disk drive as claimed in claim 9 wherein the pinned layer structure is an antiparallel (AP) pinned layer structure that includes:

ferromagnetic first and second antiparallel (AP) pinned layers with the first AP pinned layer interfacing the pinning layer and the second AP pinned layer interfacing the spacer layer; and an antiparallel (AP) coupling layer located between and interfacing the first and second AP pinned layers.

11. A method of making a magnetic read head which has an air bearing surface (ABS), comprising the steps of:

a making a spin valve sensor comprising the steps of:
forming a ferromagnetic pinned layer structure that has a magnetic moment;
forming a pinning layer exchange coupled to the pinned layer structure for pinning the magnetic moment of the pinned layer structure;
forming a ferromagnetic free layer;
forming a nonmagnetic electrically conductive spacer layer between the free layer and the pinned layer structure; and
forming the free layer of nickel iron molybdenum (NiFeMo).

12. A method as claimed in claim 11 including:
forming nonmagnetic electrically nonconductive first and second read gap layers;
forming the spin valve sensor between the first and second read gap layers;
forming ferromagnetic first and second shield layers; and
forming the first and second read gap layers between the first and second shield layers.

13. A method as claimed in claim 12 wherein the free layer is formed of nickel iron molybdenum ($Ni_{78}Fe_{12}Mo_{10}$).

14. A method as claimed in claim 13 wherein a forming of the pinned layer structure comprises the steps of:
forming ferromagnetic first and second antiparallel (AP) pinned layers with the first AP layer interfacing the pinning layer; and
forming an antiparallel (AP) coupling layer between the first and second AP pinned layers.

15. A method of making magnetic head assembly that has an air bearing surface (ABS), comprising the steps of:
making a write head including the steps of:
forming ferromagnetic first and second pole piece layers in pole tip, yoke and back gap regions wherein the yoke region is located between the pole tip and back gap regions;
forming a nonmagnetic electrically nonconductive write gap layer between the first and second pole piece layers in the pole tip region;
forming an insulation stack with at least one coil layer embedded therein between the first and second pole piece layers in the yoke region; and
connecting the first and pole piece layers at said back gap region; and making a read head including the steps of:
forming nonmagnetic electrically nonconductive first and second read gap layers;
forming a spin valve sensor between the first and second read gap layers;
forming the first and second read gap layers between the first shield layer and the first pole piece layer; and
a making of the spin valve sensor comprising the steps of:
forming a ferromagnetic pinned layer structure that has a magnetic moment;
forming a pinning layer exchange coupled to the pinned layer structure for pinning the magnetic moment of the pinned layer structure;
forming a ferromagnetic free layer;
forming a nonmagnetic electrically conductive spacer layer between the free layer and the pinned layer structure; and
the free layer being composed of nickel iron molybdenum (NiFeMo).

16. A method as claimed in claim 15 wherein the free layer is formed of nickel iron molybdenum ($Ni_{78}Fe_{12}Mo_{10}$).

17. A method as claimed in claim 16 wherein a forming of the pinned layer structure comprises the steps of:
forming ferromagnetic first and second antiparallel (AP) pinned layers with the first AP layer interfacing the pinning layer; and
forming an antiparallel (AP) coupling layer between the first and second AP pinned layers.

18. A magnetic read head as claimed in claim 1 further comprising:
another free layer composed of cobalt iron (CoFe) located between and interfacing said free and spacer layers.

19. A magnetic read head as claimed in claim 3 further comprising:
another free layer composed of cobalt iron (CoFe) located between and interfacing said free and spacer layers.

20. A magnetic head assembly as claimed in claim 5 further comprising:
another free layer composed of cobalt iron (CoFe) located between and interfacing said free and spacer layers.

21. A magnetic head assembly as claimed in claim 6 further comprising:
another free layer composed of cobalt iron (CoFe) located between and interfacing said free and spacer layers.

22. A magnetic disk drive as claimed in claim 8 further comprising:
another free layer composed of cobalt iron (CoFe) located between and interfacing said free and spacer layers.

23. A magnetic disk drive as claimed in claim 9 further comprising:
another free layer composed of cobalt iron (CoFe) located between and interfacing said free and spacer layers.

24. A method as claimed in claim 11 further comprising:
forming another free layer composed of cobalt iron (CoFe) between and interfacing said free and spacer layers.

25. A method as claimed in claim 13 further comprising:
forming another free layer composed of cobalt iron (CoFe) between and interfacing said free and spacer layers.

26. A method as claimed in claim 15 further comprising:
forming another free layer composed of cobalt iron (CoFe) between and interfacing said free and spacer layers.

27. A method as claimed in claim 16 further comprising:
forming another free layer composed of cobalt iron (CoFe) between and interfacing said free and spacer layers.

* * * * *